US009519516B2

(12) United States Patent
Motoki

(10) Patent No.: US 9,519,516 B2
(45) Date of Patent: Dec. 13, 2016

(54) MIGRATION SYSTEM, MIGRATION METHOD AND NON-TRANSITORY COMPUTER-READABLE MEDIUM STORING CONTROL PROGRAM

(71) Applicant: NEC Corporation, Minato-ku, Tokyo (JP)

(72) Inventor: Akihiro Motoki, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/413,786

(22) PCT Filed: Jul. 5, 2013

(86) PCT No.: PCT/JP2013/004186
§ 371 (c)(1),
(2) Date: Jan. 9, 2015

(87) PCT Pub. No.: WO2014/010213
PCT Pub. Date: Jan. 16, 2014

(65) Prior Publication Data
US 2015/0205638 A1 Jul. 23, 2015

(30) Foreign Application Priority Data

Jul. 11, 2012 (JP) .................................. 2012-155909

(51) Int. Cl.
*G06F 13/00* (2006.01)
*G06F 9/50* (2006.01)
(Continued)

(52) U.S. Cl.
CPC ............. *G06F 9/5016* (2013.01); *G06F 3/067* (2013.01); *G06F 3/0619* (2013.01);
(Continued)

(58) Field of Classification Search
CPC .... G06F 9/5016; G06F 9/4856; G06F 3/0619; G06F 9/45533; G06F 3/067; G06F 9/5088; G06F 3/0647; G06F 2009/4557; G06F 3/065; G06F 11/2071; G06F 11/2069; G06F 11/2074; H04L 49/70
(Continued)

(56) References Cited

U.S. PATENT DOCUMENTS

2005/0268054 A1* 12/2005 Werner ............... G06F 11/2069
711/162
2007/0130213 A1* 6/2007 Jean-Denis ......... G06F 11/2064
(Continued)

FOREIGN PATENT DOCUMENTS

| JP | 2009-140053 A | 6/2009 |
| JP | 2011-186821 A | 9/2011 |
| JP | 2012-88808 A | 5/2012 |

OTHER PUBLICATIONS

International Search Report for Pot Application No. PCT/JP2013/004186, mailed on Sep. 24, 2013.

*Primary Examiner* — Hong Kim

(57) ABSTRACT

The present invention addresses the problem of providing a migration system and a migration method by which a completion timing of a live migration of virtual machines can be adjusted. The migration system (1) comprises: a transfer means (61A) for transmitting memory data of the virtual machines from a transfer source physical host (31) to a transfer destination physical host (32) to synchronize data of the virtual machines on the physical host (31) and the virtual machines on the physical host (32); a determination means (51A) for determining, for each of the virtual machines, whether the data of the virtual machine (81A) on the transfer source physical host (31) is synchronized with the data of the virtual machine (81B); and a control means (10) for issuing an instruction of switching from the virtual machines on the physical host (31) to the virtual machines on the physical host (32), if the data of all the virtual machines is synchronized based on the determination result. The transfer means (61A) continues transmitting the memory data until the instruction of switching is issued.

10 Claims, 8 Drawing Sheets

(51) Int. Cl.
*G06F 3/06* (2006.01)
*G06F 9/455* (2006.01)
*G06F 9/48* (2006.01)

(52) U.S. Cl.
CPC ...... *G06F 9/45533* (2013.01); *G06F 9/45558* (2013.01); *G06F 9/4856* (2013.01); *G06F 9/5088* (2013.01); *G06F 3/065* (2013.01); *G06F 3/0647* (2013.01); *G06F 2009/4557* (2013.01)

(58) Field of Classification Search
USPC .................. 711/6, 162; 714/4.4; 709/238
See application file for complete search history.

(56) References Cited

U.S. PATENT DOCUMENTS

| | | | |
|---|---|---|---|
| 2012/0110237 A1* | 5/2012 | Li ................... | G06F 9/45558 711/6 |
| 2012/0203963 A1* | 8/2012 | Kawamura ........... | G06F 3/0608 711/113 |
| 2012/0227041 A1* | 9/2012 | Lambeth ........... | H04L 29/12839 718/1 |
| 2014/0115289 A1* | 4/2014 | Morishita ............. | G06F 3/0608 711/162 |
| 2015/0149999 A1* | 5/2015 | Ramanathan ......... | G06F 9/4856 718/1 |

* cited by examiner

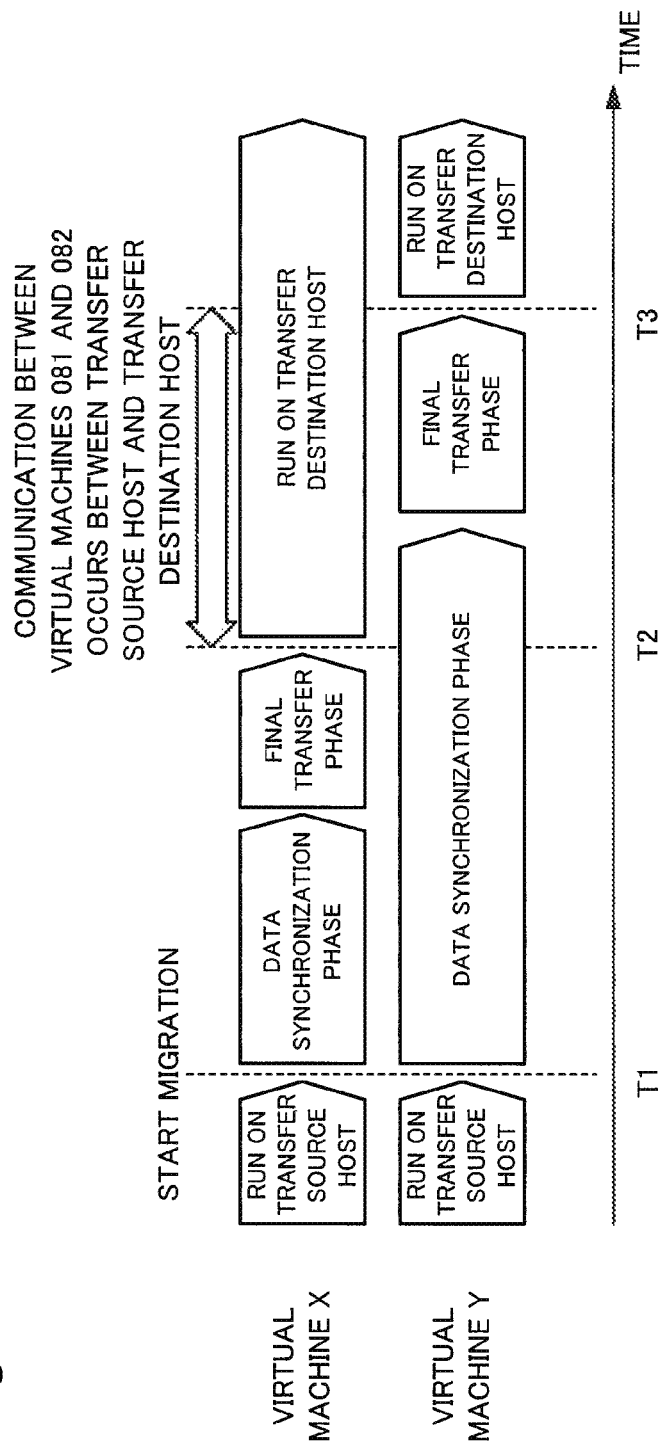

MIGRATION SYSTEM, MIGRATION METHOD AND NON-TRANSITORY COMPUTER-READABLE MEDIUM STORING CONTROL PROGRAM

This application is a National Stage Entry of PCT/JP2013/004186 filed on Jul. 5, 2013, which claims priority from Japanese Patent Application 2012-155909filed on Jul. 11, 2012, the contents of all of which are incorporated herein by reference, in their entirety.

TECHNICAL FIELD

The present invention relates to a migration system, a migration method, and a control program. Specifically, the present invention relates to a migration system, a migration method, and a non-transitory computer-readable medium storing a computer program that migrate a plurality of virtual machines running cooperatively.

BACKGROUND ART

Recent years have seen advancement of cloud computing technology. Infrastructure as a Service (IaaS) has been widely used to lease virtual machines running on a physical host to users.

In IaaS, a user is called a tenant. One tenant typically uses a plurality of virtual machines. In view of disaster planning and business continuity, there is a trend to deploy IaaS infrastructures to a plurality of physically remote locations and connect the IaaS infrastructures to operate them as a single virtual IaaS infrastructure.

Regarding IaaS, live-migration techniques are being developed that transfer running virtual machines to another physical host. Live-migration techniques are implemented in a kernel-based virtual machine (KVM) of Linux (registered trademark), VMotion of VMware, Inc., and the like. For example, a virtual machine running on a physical host is transferred to another physical host depending on operation statuses of the physical hosts on a platform that IaaS is built on.

PTL1 describes a technology regarding a virtual-environment management system. The technology described in PTL1 includes a detection means for detecting a job for starting communication processing between virtual machines, a determination means for determining whether the cost of the communication processing, which is conducted by the job detected by the detection means, is equal to or greater than a certain amount, and an arrangement means for arranging the virtual machines so as to cause the virtual machines starting the communication processing to run on the same host machine when the determination means determines that the cost of the communication processing is equal to or greater than the certain amount.

CITATION LIST

Patent Literature

PTL1: Japanese Patent Application Laid-Open Publication No. 2011-186821

SUMMARY OF INVENTION

Technical Problem

As described above, in recent years, a tenant that uses IaaS typically owns a plurality of virtual machines. The virtual machines used by the same tenant often operate in cooperation with each other to implement a certain service. Furthermore, the virtual machines in many cases are provided on the same physical host and communicate with each other.

If the virtual machines running cooperatively are transferred to another physical location, for example, for the convenience of the tenant, the virtual machines running cooperatively need to be live-migrated at the same time. Live-migration of virtual machines, however, depends on operation statuses of the virtual machines. Consequently, the time needed for live-migration varies significantly.

A general migration method is described below. Live-migration of a virtual machine is controlled by a tenant control means that determines an arrangement of virtual machines on the entire IaaS platform. The tenant control means issues an instruction of live-migration to the hypervisor of a physical host on which the virtual machine to be transferred runs.

FIG. 7 illustrates a flowchart of operations performed by the hypervisor when live-migration is executed. The operation flow is divided roughly to a data synchronization phase and a final transfer phase.

First, live-migration starts when the hypervisor receives a migration instruction from the tenant control means. In the data synchronization phase, an empty virtual machine is created on a transfer destination physical host (step S31). Next, a memory snapshot of a transfer source physical host is acquired (step S32) and data of the acquired snapshot is transmitted to the transfer destination physical host (step S33).

Next, determination is made whether data synchronization between the transfer source virtual machine and the transfer destination virtual machine has reached a certain standard based on the amount of data difference between the previously acquired memory snapshot and current memory data (step S43). When the data synchronization has not reached the standard (No at step S34), acquisition of a memory snapshot and transfer of the difference between snapshots to the transfer destination are repeated (steps S32 to S34). When the data synchronization has reached the standard, the data synchronization phase is completed (Yes at step S34) and the operation proceeds to the final transfer phase.

In the final transfer phase, operation of the transfer source virtual machine is interrupted (hereinafter called "suspend") first (step S39). Next, the memory data and the central processing unit (CPU) status of the virtual machine that has been interrupted are transmitted to the transfer destination virtual machine (step S40).

On the transfer destination physical host, the data of the virtual machine received from the destination source physical host is written in the transfer destination virtual machine and the transfer destination virtual machine starts running (step S41). At this point, the virtual machine having been running on the transfer source physical host until the migration instruction completes the transfer to the transfer destination physical host.

Finally, the transfer source virtual machine is deleted from the transfer source physical host (step S42), the tenant control means that has issued the migration instruction is notified of completion of the migration (step S43), and the migration processing of the virtual machine is completed.

FIG. 8 is a diagram illustrating a case where a plurality of virtual machines running cooperatively are transferred by a general live-migration method. First, migration processing starts at a time T1. For a virtual machine X, the data synchronization phase and the final transfer phase is completed between the time T1 and a time T2. The virtual machine X starts running on a transfer destination physical host from the time T2.

On the other hand, for a virtual machine Y, the data synchronization phase starts at the time T1 and continues at and after the time T2. The data synchronization phase and the final transfer phase is completed between the time T1 and a time T3.

Accordingly, as illustrated in FIG. 8, the general live-migration method causes the virtual machine X to run on the transfer source physical host, and the virtual machine Y to run on a transfer destination physical host Y, between the time T2 and the time T3.

As described above, in recent years, one tenant on an IaaS platform typically owns a plurality of virtual machines, and thus virtual machines are transferred for each tenant. In general, the virtual machines that belong to the same tenant often operate in cooperation with each other to implement a certain service.

By the general live-migration method, however, if the virtual machines are desired to be transferred simultaneously to another physical host, live-migration of the virtual machines starts simultaneously but is not completed simultaneously.

In other words, when the virtual machines running on a physical location are live-migrated to another physical location, the time needed to complete the live-migration varies depending on the virtual machine, leading to a situation where some virtual machines have resumed running on the transfer destination physical location while other virtual machines are still running on the transfer source physical location.

In such a case, communication occurs between the transfer source physical host and the transfer destination physical host until the migration of all the virtual machines is completed. Furthermore, if the physical distance between the transfer source and the transfer destination is large, communication between the physical machines occurs between the physically distant hosts. In this case, an increase in unnecessary traffic and communication delays between the locations may degrade application performance.

In order to solve such a problem, the object of the present invention is to provide a migration system, a migration method, and a non-transitory computer-readable medium storing a control program, the migration system, the migration method, and the control program being capable of adjusting a completion time of live-migration of virtual machines.

Solution to Problem

A migration system for migrating a plurality of virtual machines according to an exemplary aspect of the invention includes: a transfer means for transmitting memory data of the virtual machines from a transfer source physical host to a transfer destination physical host to synchronize data of the virtual machines on the transfer source physical host with data of the virtual machines on the transfer destination physical host; a determination means for determining, for each of the virtual machines, whether the data of the virtual machine on the transfer source physical host is synchronized with the data of the virtual machine on the transfer destination physical host, based on a predetermined determination criterion for synchronization; and a control means for issuing an instruction of switching from the virtual machines on the transfer source physical host to the virtual machines on the transfer destination physical host, based on a result determined by the determination means, wherein the control means issues the instruction of the switching if, for all the virtual machines, the data of the virtual machine on the transfer source physical host is synchronized with the data of the virtual machine on the transfer destination physical host, and the transfer means continues transmitting the data from the transfer source physical host to the transfer destination physical host until the instruction of the switching is issued.

A migration method for migrating a plurality of virtual machines according to an exemplary aspect of the invention includes: transmitting memory data of the virtual machines from a transfer source physical host to a transfer destination physical host to synchronize data of the virtual machines on the transfer source physical host with data of the virtual machines on the transfer destination physical host; determining, for each of the virtual machines, whether the data of the virtual machine on the transfer source physical host is synchronized with the data of the virtual machine on the transfer destination physical host, based on a predetermined determination criterion for synchronization; issuing an instruction of switching from the virtual machines on the transfer source physical host to the virtual machines on the transfer destination physical host, if, for all the virtual machines, the data of the virtual machine on the transfer source physical host is synchronized with the data of the virtual machine on the transfer destination physical host, based on a result of the determining; and continuing transmitting the data from the transfer source physical host to the transfer destination physical host until the instruction of the switching is issued.

A non-transitory computer readable storage medium according to an exemplary aspect of the invention records thereon a control program, causing a computer to perform a migration process for a plurality of virtual machines by controlling a transfer source physical host and a transfer destination physical host, the process comprising: transmitting memory data of the virtual machines from the transfer source physical host to the transfer destination physical host to synchronize data of the virtual machines on the transfer source physical host with data of the virtual machines on the transfer destination physical host; determining, for each of the virtual machines, whether the data of the virtual machine on the transfer source physical host is synchronized with the data of the virtual machine on the transfer destination physical host, based on a predetermined determination criterion for synchronization; issuing an instruction of switching from the virtual machines on the transfer source physical host to the virtual machines on the transfer destination physical host, if, for all the virtual machines, the data of the virtual machine on the transfer source physical host is synchronized with the data of the virtual machine on the transfer destination physical host, based on a result of the determining; and continuing transmitting the data from the transfer source physical host to the transfer destination physical host until the instruction of the switching is issued.

Advantageous Effects of Invention

The present invention provides a migration system, a migration method, and a non-transitory computer-readable medium storing a control program. The migration system, the migration method, and the control program are capable of adjusting a completion time of live-migration of virtual machines.

BRIEF DESCRIPTION OF DRAWINGS

FIG. 8 is a diagram illustrating a case where a plurality of virtual machines are transferred by a general live-migration method.

DESCRIPTION OF EMBODIMENTS

First Exemplary Embodiment

Figure 1:
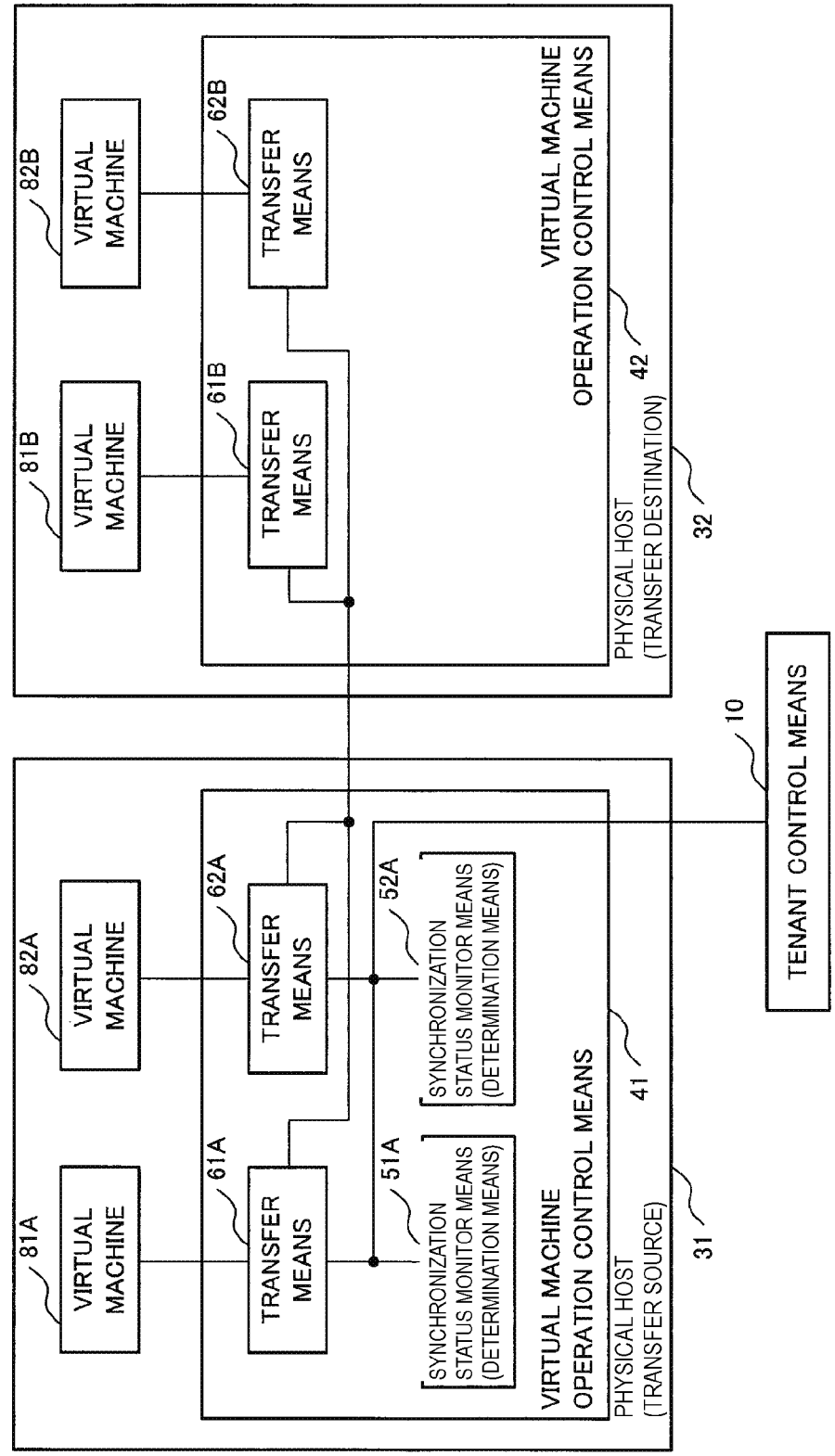
FIG. 1 is a block diagram illustrating a structure of a migration system for virtual machines according to a first exemplary embodiment.

The following describes a first exemplary embodiment of the present invention with reference to the drawings. FIG. 1 is a block diagram illustrating a migration system 1 of virtual machines according to the first exemplary embodiment. The migration system 1 according to the first exemplary embodiment is a system that can transfer two or more virtual machines running cooperatively on one physical host to another physical host.

The migration system 1 includes a physical host 31, a physical host 32, and a tenant control means 10 as a controller.

The physical hosts 31 and 32 specifically are servers. In the first exemplary embodiment, the physical host 31 is a server on which a plurality of virtual machines to be live-migrated run before transfer. The physical host 32 is a server on which the virtual machines to be live-migrated is to run after transfer. The virtual machines to be live-migrated cooperatively operate to provide one service and communicate necessary data to each other.

The tenant control means 10 issues an instruction to migrate the virtual machines operating cooperatively and controls live-migration of the virtual machines. The tenant control means 10 determines, for example, an arrangement of the virtual machines in the entire migration system, and controls a virtual machine operation control means 41 in the physical host on which the virtual machines to be live-migrated run.

The following describes a case where virtual machines 81 and 82 are live-migrated. In other words, a virtual machine 81A on the physical host 31 before transfer is transferred to be a virtual machine 81B on the physical host 32. Similarly, a virtual machine 82A on the physical host 31 before transfer is transferred to be a virtual machine 82B on the physical host 32.

The physical host 31 includes the virtual machine operation control means 41 and the physical host 32 includes a virtual machine operation control means 42.

The virtual machine operation control means 41 controls transfer means 61A and 62A and synchronization status monitor means 51A and 52A. The virtual machine operation control means 41 controls virtual machines running on the transfer source physical host 31 such as the virtual machines 81A and 82A. The virtual machine operation control means 42 controls virtual machines running on the transfer destination physical host 32 such as the virtual machines 81B and 82B.

The virtual machine operation control means 41 includes the transfer means 61A, the transfer means 62A, the synchronization status monitor means 51A as a monitor, and the synchronization status monitor means 52A as a monitor.

The transfer means 61A and the synchronization status monitor means 51A are provided for the virtual machine 81A and execute live-migration of the virtual machine 81A. The transfer means 62A and the synchronization status monitor means 52A are provided for the virtual machine 82A and execute live-migration of the virtual machine 82A.

The transfer means 61A intermittently transmits memory data of the virtual machine 81A from the transfer source physical host 31 to the transfer destination physical host 32 to synchronize the data of the virtual machine 81A on the transfer source physical host with data of the virtual machine 81B on the transfer destination physical host. In the same way, the transfer means 62A intermittently transmits memory data of the virtual machine 82A from the transfer source physical host 31 to the transfer destination physical host 32 to synchronize the data of the virtual machine 82A on the transfer source physical host with data of the virtual machine 82B on the transfer destination physical host.

The transfer means 61A and 61B continue data transmission to synchronize the data until the tenant control means 10 issues an instruction of switching of virtual machines. When the tenant control means 10 issues an instruction of switching of virtual machines, the transfer means 61A stops and deletes the virtual machine 81A. Similarly, the transfer means 61B stops and deletes the virtual machine 82A.

The synchronization status monitor means 51A monitors data output by the transfer means 61A. The synchronization status monitor means 52A monitors data output by the transfer means 62A. The synchronization status monitor means 51A and 52A each calculate the amount of data difference between the previously output data and the most recently output data. When the amount of data difference is equal to or smaller than a certain threshold, the synchronization status monitor means 51A and 52B notify the tenant control means 10 of completion of data synchronization.

Note that the transfer means and the synchronization status monitor means are provided for each virtual machine, which means that when one virtual machine is added, one transfer means and one synchronization status monitor means are added as well. Two virtual machines are provided here; however, three or more virtual machines may be provided. Furthermore, the transfer means and the synchronization status monitor means are not necessarily provided for each virtual machine.

The transfer destination physical host 32 includes the virtual machine operation control means 42. The virtual machine operation control means 42 includes the transfer means 61B for the virtual machine 81B and includes the transfer measure 62B for the virtual machine 82B, to live-migrate the virtual machines 81B and 82B.

The transfer means 61B receives memory data of the virtual machine 81A output by the transfer means 61A, and writes the data in the virtual machine 81B. In the same way, the transfer means 62B receives memory data of the virtual machine 82A output by the transfer means 62A, and writes the data in the virtual machine 82B.

Figure 2:
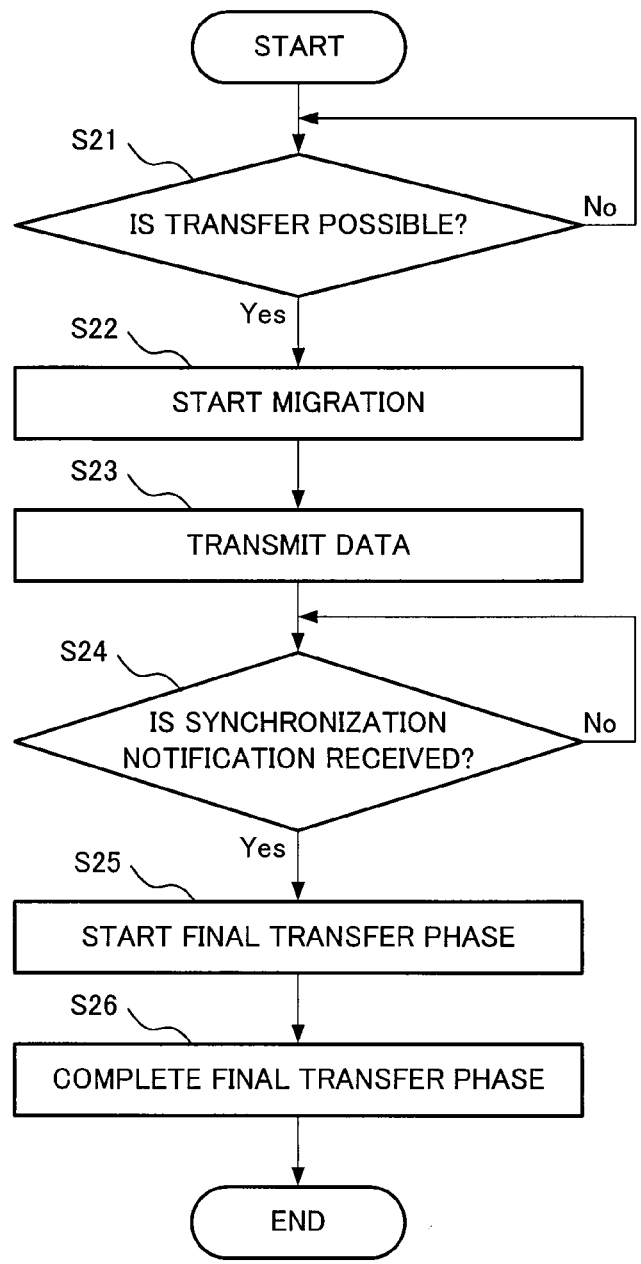
FIG. 2 is a flowchart illustrating an outline of operations of a tenant control means according to the first exemplary embodiment.

Next, the following describes operations to execute live-migration. FIG. 2 is a flowchart illustrating an outline of operations of the tenant control means 10. The following describes a case where the virtual machines 81A and 82A on the physical host 31 are live-migrated to the physical host 32.

The tenant control means 10 determines whether it is possible to transfer, to the physical host 32B that is a transfer destination, the virtual machines 81A and 82A to be transferred (Yes at step S21). If the transfer is not possible, live-migration is not executed (No at step S21).

If the tenant control means 10 determines that it is possible to transfer the virtual machines 81A and 82A to the physical host 32, the tenant control means 10 issues an instruction of live-migration to the virtual machine operation control means 41 in the physical host 31A on which the virtual machines 81A and 82A to be transferred run. The migration start instruction contains information on the physical host 32 that is the transfer destination of the virtual machines 81A and 82A. The migration start instruction is issued on the virtual machine 82A as well.

On receiving the migration instruction from the tenant control means 10, the virtual machine operation control means 41 starts live-migration (step S22).

On receiving the migration start instruction from the tenant control means 10, the transfer means 61A transmits data necessary for migrating the virtual machine 81A to the transfer destination physical host 32.

Similarly to the transfer means 61A, on receiving the migration start instruction from the tenant control means 10 via the virtual machine operation control means 41, the transfer means 62A transmits data necessary for migrating the virtual machine 82B to the transfer destination physical host 32.

The transfer means 61B receives the data necessary for migrating the virtual machine 81A from the transfer source physical host 31, and writes the data in the virtual machine 81B. In the same way, the transfer means 62B receives the data necessary for migrating the virtual machine 82A from the physical host 31, and writes the data in the virtual machine 82B (step S23).

The synchronization status monitor means 51A monitors statuses of the virtual machine 81A and the transfer means 61A, determines whether data synchronization is completed between the virtual machine 81A and the virtual machine 81B on the physical host 32, and notifies the tenant control means 10 of the completion.

Similarly to the synchronization status monitor means 51A, the synchronization status monitor means 52A monitors statuses of the virtual machine 82A and the transfer means 62A, determines whether data synchronization is completed between the virtual machine 82A and the transfer destination virtual machine 82B on the physical host 32, and notifies the tenant control means 10 of the completion.

The tenant control means 10 waits to receive data synchronization completion notifications from all the virtual machines to which the tenant control means 10 issued migration start instructions. When the tenant control means 10 has not received data synchronization completion notifications from both the synchronization status monitor means 51A and 52A, the transfer means 61A and 62A continue transmitting the data necessary for live-migration (No at step S24).

On receiving the data synchronization completion notifications from the synchronization status monitor means 51A and 52A (Yes at step S24), the tenant control means 10 instructs the transfer means 61A and 62A to stop the virtual machines 81A and 82A on the transfer source physical host 31A and to start the virtual machines 81B and 82B on the transfer destination physical host 32B (step S25).

The tenant control means 10 waits to receive the migration completion notifications of all the virtual machines from the synchronization status monitor means 51A and 51B (step S26). When the tenant control means 10 receives the completion notifications, live-migration is completed.

By the live-migration method according to the first exemplary embodiment, the final phases are entered after all pieces of data of all the virtual machines operating cooperatively have completed synchronization. As a result, the final phases of all the virtual machines start at the same time. This configuration can therefore prevent a situation from occurring where some virtual machines run on the transfer destination while the other virtual machines run on the transfer source. This configuration can eliminate communication between cooperatively operating virtual machines being performed via physical communication, and thus can prevent degradation of application performance, such as a communication delay.

Note that, in the first exemplary embodiment, the transfer source virtual machines 81A and 82A run on a single physical host 31. The transfer source virtual machines, however, do not need to run on a single common physical host, but may run on separate physical machines.

In the same way, the transfer destination virtual machines 81B and 82B run on a single physical host 32. The transfer destination virtual machines, however, do not need to run on a single common physical host, but the physical machines on which the virtual machines run may be different.

Although FIG. 1 illustrates only the virtual machines to be migrated, virtual machines not to be migrated may run on the transfer source physical host and the transfer destination physical host, obviously.

Figure 3:
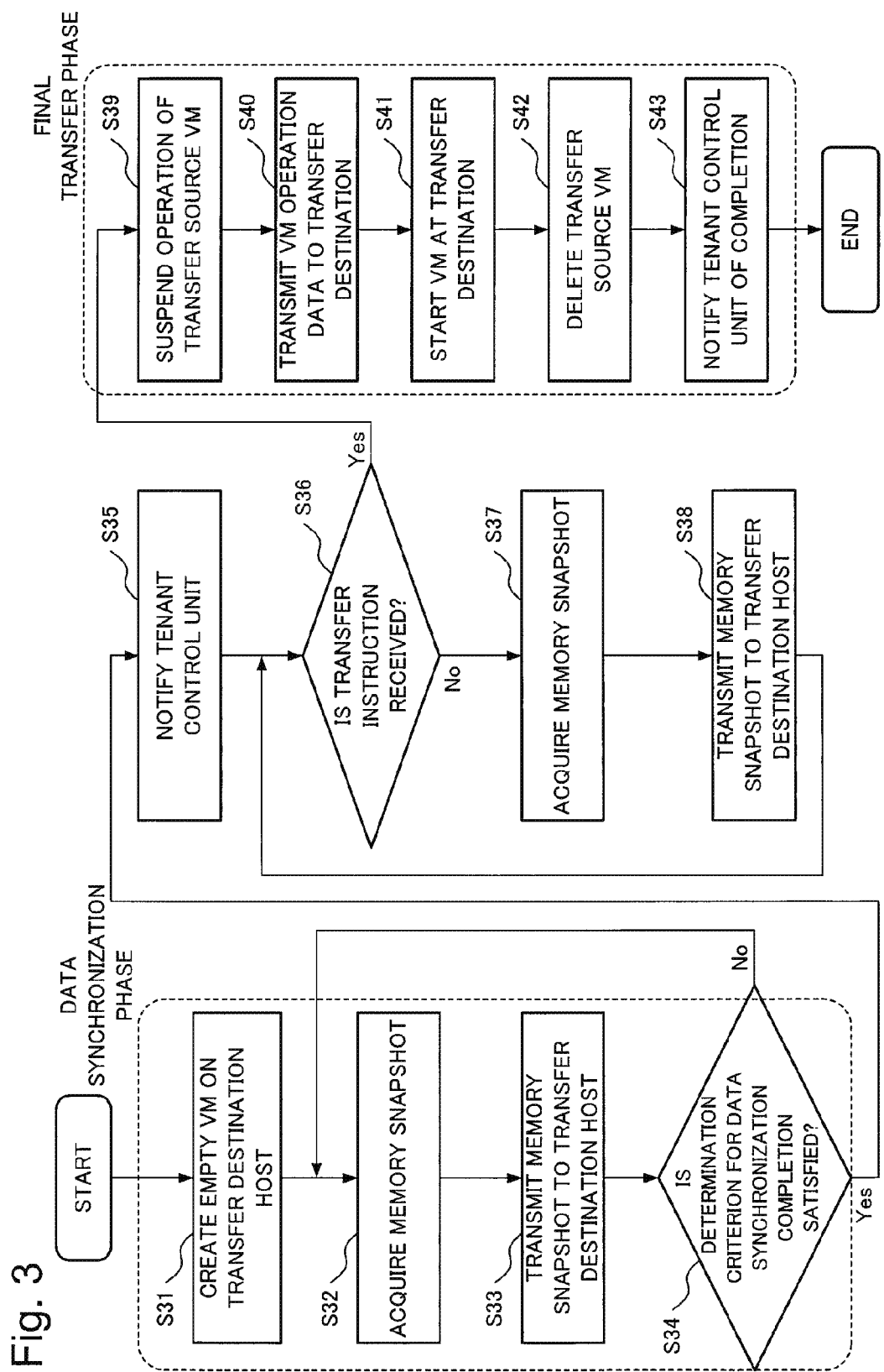
FIG. 3 is a flowchart illustrating operations of a transfer means and a synchronization status monitor means according to the first exemplary embodiment.

Next, the following further describes detailed operations of the migration system according to the first exemplary embodiment. FIG. 3 is a flowchart illustrating operations of the transfer means 61A and the synchronization status monitor means 51A. The tenant control means 10 outputs a migration start instruction containing information on the transfer destination physical host to the transfer means 61A.

On receiving the migration start instruction, the transfer means 61A transmits a request to the transfer means 61B in the transfer destination physical host 32 to create an empty virtual machine 81B based on the information on the transfer destination physical host (step S31).

Next, the transfer means 61A acquires a memory snapshot of the virtual machine 81A as data necessary for live-migration (step S32) and transmits the data of the acquired memory snapshot to the transfer means 61B on the transfer destination physical host 32 (step S33). On receiving the data, the transfer means 61B writes the received data of the memory snapshot in the virtual machine 81B.

After the transfer means 61A transmits the data of the memory snapshot to the transfer destination physical host 32, the synchronization status monitor means 51A determines whether the transfer source virtual machine 81A and the transfer destination virtual machine 81B have completed data synchronization (step S34).

Note that the determination on data synchronization completion is performed based on a determination criterion implemented by an existing hypervisor. For example, a KVM, which is one of hypervisors, determines data synchronization completion based on the amount of data difference between the previously acquired memory snapshot and the current memory snapshot, and the data transfer rate between a transfer source and a transfer destination. Specifically, a KVM determines that the determination criterion for data synchronization completion is satisfied when the data difference is transferred within three seconds.

The KVM may determine that the determination criterion for data synchronization completion is satisfied when the amount of data difference between the previously acquired memory snapshot and the current memory snapshot is smaller than a predetermined threshold. When the determination criterion is not satisfied (No at step S34), the process returns to step S32 and repeats the operations described above until the determination criterion is satisfied.

Steps S31 to S34 described above are the same as those in the operation flow of general live-migration of virtual machines. The operations of steps S31 to S34 are collectively called the data synchronization phase and the operations of steps S39 to S43 described later are collectively called the final transfer phase.

When determining that the determination criterion for data synchronization completion is satisfied at step S34 (Yes at step S34), the synchronization status monitor means 51A transmits a data synchronization completion notification to the tenant control means 10 (step S35).

The synchronization status monitor means 51A determines whether a start instruction of the final transfer phase has been received from the tenant control means 10 (step S36).

When the start instruction has not been received (No at step S36), a memory snapshot is acquired again (step S37) and the acquired snapshot is transmitted to the transfer destination host (step S38).

The synchronization status monitor means 51A then returns to the determination whether it has received the start instruction of the final transfer phase (step S306).

The details of steps S37 and S38 are identical to those of steps S32 and S33. Repeating steps S37 and S38 maintains a status in which the data of the transfer source virtual machine 81A and the data of the transfer destination virtual machine 81B are kept synchronized while the synchronization status monitor means 51A waits to receive the start instruction of the final transfer phase from the tenant control means 10.

When the start instruction of the final transfer phase is received from the tenant control means 10 at step S38 (Yes at S38), the process proceeds to the final transfer phase at step S39 and steps subsequent thereto.

First, the transfer means 61A suspends the operation of the transfer source virtual machine 81A (step S39) and transmits the memory data and the CPU status (such as a register) of the virtual machine 81A the operation of which has been interrupted to the transfer destination virtual machine 81B (step S40).

The transfer means 61B on the transfer destination physical host 32 writes the data received from the transfer means 61A, the data being of the virtual machine 81A the operation of which has been interrupted, in the virtual machine 81B. The transfer means 61B then starts the virtual machine 81B (step S41). At this point, the virtual machine 81A having been running on the physical host 31 until the migration instruction completes the transfer to the physical host 32.

Finally, the transfer means 61A on the transfer source physical host 31 deletes the transfer source virtual machine 81A (step S42) and notifies the tenant control means 10 of the completion of the migration (step S43). The above process completes the migration processing of the virtual machine 81A by the virtual machine operation control means 41.

In general, the process proceeds to the final transfer phase immediately after the data synchronization phase is completed; however, in the first exemplary embodiment, the process does not proceed to the final transfer phase even though the data synchronization between the virtual machine 81A on the transfer source physical host 31 and the virtual machine 81B on the transfer destination physical host 32 is completed unless an instruction is received from the tenant control means 10, and thus the data synchronization is continued. This configuration allows adjustment of a transfer completion time in the live-migration according to the first exemplary embodiment.

Figure 4:
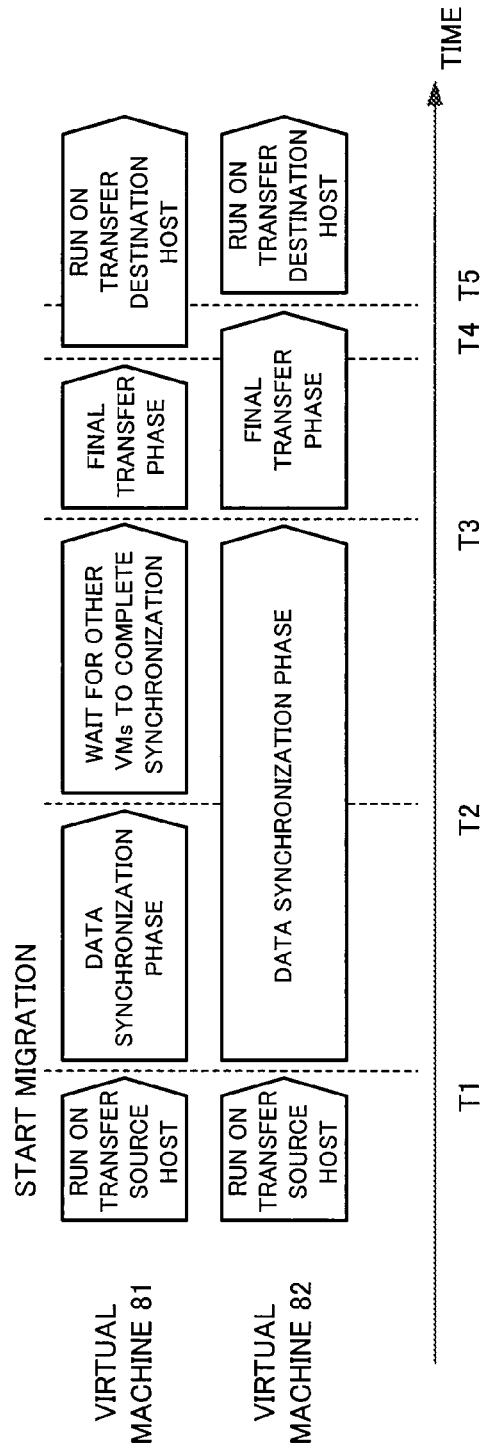
FIG. 4 is a diagram illustrating elapse of the time for operations performed when two virtual machines according to the first exemplary embodiment are live-migrated simultaneously.

FIG. 4 is a diagram illustrating elapse of the time for operations performed when two virtual machines are live-migrated simultaneously.

At a time T1, the tenant control means 10 issues a transfer start instruction at step S21 on each of the virtual machines 81 and 82 to be migrated.

The transfer means 61A and 62A each start the data synchronization phase (steps S31 to S34). The time required to complete the data synchronization phase depends on operation statuses of the virtual machines, and thus the completion time of the data synchronization phase varies.

In FIG. 4, the data synchronization of the virtual machine 81 is completed at a time T2 while the data synchronization of the virtual machine 82 is completed at a time T3.

The virtual machine 81 waits for the start instruction of the final transfer phase from the tenant control means 10 from the time T2 to the time T3. During that time, the data synchronization between the transfer source virtual machine and the transfer destination virtual machine is continued at steps S37 and S38 (steps S36 to S38).

When determining that the data synchronization of the virtual machine 82 has been completed at the time T3, the synchronization status monitor means 52A notifies the tenant control means 10 of the completion of the synchronization. The tenant control means 10 determines that data synchronization completion notifications have been received from all the virtual machines to be migrated, here, the two virtual machines 81 and 82 (step S24).

The tenant control means 10 then issues a start instruction of the final transfer phase to each of the transfer means 61A and 62A for all the respective virtual machines to be migrated (step S25). On receiving the start instructions of the respective final transfer phases from the tenant control means 10, the transfer means 61A and 62A interrupt operations of the respective transfer source virtual machines 81A and 82A (step S39). The transfer means 61A and 62A then transmit the operation data of the respective transfer source virtual machines to the transfer destination (step S40).

The transfer means 61B and 62B on the transfer destination physical host start the respective transfer destination virtual machines 81B and 82B. When the transfer destination virtual machines completed starting, the transfer means 61A and 62A delete the respective transfer source virtual machines 81A and 82A (step S42), and finally notify the tenant control means 10 of the completion of the respective final transfer phases (step S43).

The execution time of the final transfer phase at steps S39 to S43 more or less varies depending on the operation status of the virtual machine. The virtual machine 81 completes the final transfer phase at a time T4 while the virtual machine 82 completes the final transfer phase at a time T5.

As illustrated in FIG. 4, all the virtual machines to be migrated run on the transfer source physical host until the time T3. Between the times T3 and T5, one or more virtual machines to be migrated stop operating and the rest of virtual machines run on the transfer destination physical host. At and after the time T5, all the virtual machines to be migrated run on the transfer destination physical host.

By the live-migration method according to the first exemplary embodiment, communication between the virtual machines 81 and 82 does not occur between the transfer source host and the transfer destination host. This configuration therefore can further prevent an increase in traffic and degradation of application performance.

Furthermore, in the first exemplary embodiment, although operation of a virtual machine is stopped during the final transfer phase, the duration of stop can be decreased. This decrease is achieved because the final transfer phases start simultaneously at or after the time T3 for all the virtual machines in the first exemplary embodiment while the final transfer phases start at different times for respective virtual machines by a general live-migration method.

Second Exemplary Embodiment

The following describes a second exemplary embodiment with reference to the drawings. A system configuration according to the second exemplary embodiment is the same as that of the first exemplary embodiment, and redundant descriptions are omitted as appropriate. A live-migration method according to the second exemplary embodiment differs from that of the first exemplary embodiment in the operation flow of a tenant control unit 1 and in the operation flow of the synchronization status monitor means 51A and 52A on the transfer source physical host 31.

When data synchronization completion notifications are not received for some virtual machines among the virtual machines to be migrated, the tenant control means 10 according to the second exemplary embodiment changes the determination criterion for data synchronization completion for the virtual machines the data synchronization completion of which has not been notified.

Figure 5:
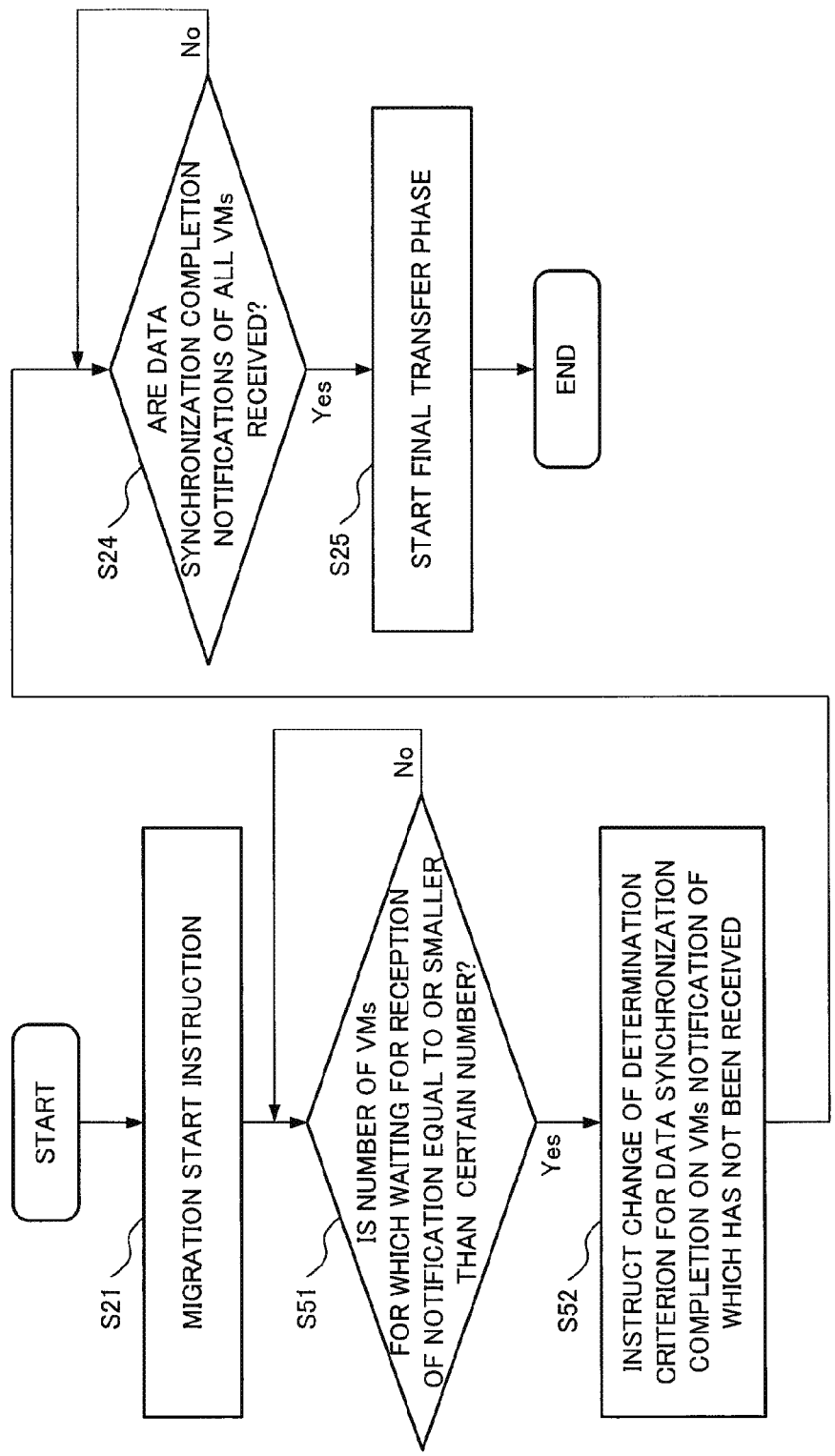
FIG. 5 is a flowchart illustrating operations of a tenant control means according to a second exemplary embodiment.

FIG. 5 is a flowchart illustrating operations of the tenant control means 10 according to the second exemplary embodiment. The operation flow according to the second exemplary embodiment differs from that of FIG. 2 in steps S51 and S52.

First, at step S21, the tenant control means 10 issues migration start instructions on all the virtual machines to be migrated. The tenant control means 10 then waits for a data synchronization completion notification from each of the synchronization status monitor means 51A and 52A.

At this point, in the second exemplary embodiment, the tenant control means 10 changes the determination criterion for data synchronization when the percentage of the number of virtual machines for which the tenant control means 10 waits to receive the data synchronization completion notifications at step S21 (that is, the data synchronization completion of which has not been notified to the tenant control means 10), to the number of the virtual machines to be migrated, is equal to or smaller than a certain threshold.

At step S52, the tenant control means 10 instructs a change of the determination criterion for data synchronization completion for the virtual machines for which the tenant control means 10 has not received the data synchronization completion notifications.

The threshold used at step S51 may be a fixed value regardless of the number of virtual machines to be migrated, or may be a fixed percentage of the number of virtual machines to be migrated. The threshold of data synchronization completion may be changed when a data synchronization completion notification is not received after a predetermined time has elapsed from the start of migration.

At step S52, a change is instructed regarding the amount of data difference that is output by the transfer means 61A and monitored by the synchronization status monitor means 51A and 52A. The amount of data difference is generally defined as a certain amount equal to or smaller than a certain percentage to the amount of memory snapshot data. The threshold of this percentage is changed, for example.

The virtual machines that have not completed data synchronization may be regarded as the virtual machines that have completed data synchronization. As described above, in the second exemplary embodiment, the data synchronization determination criterion for the virtual machines that have not completed data synchronization is changed according to data synchronization completion statuses of the virtual machines to be migrated.

Figure 6:
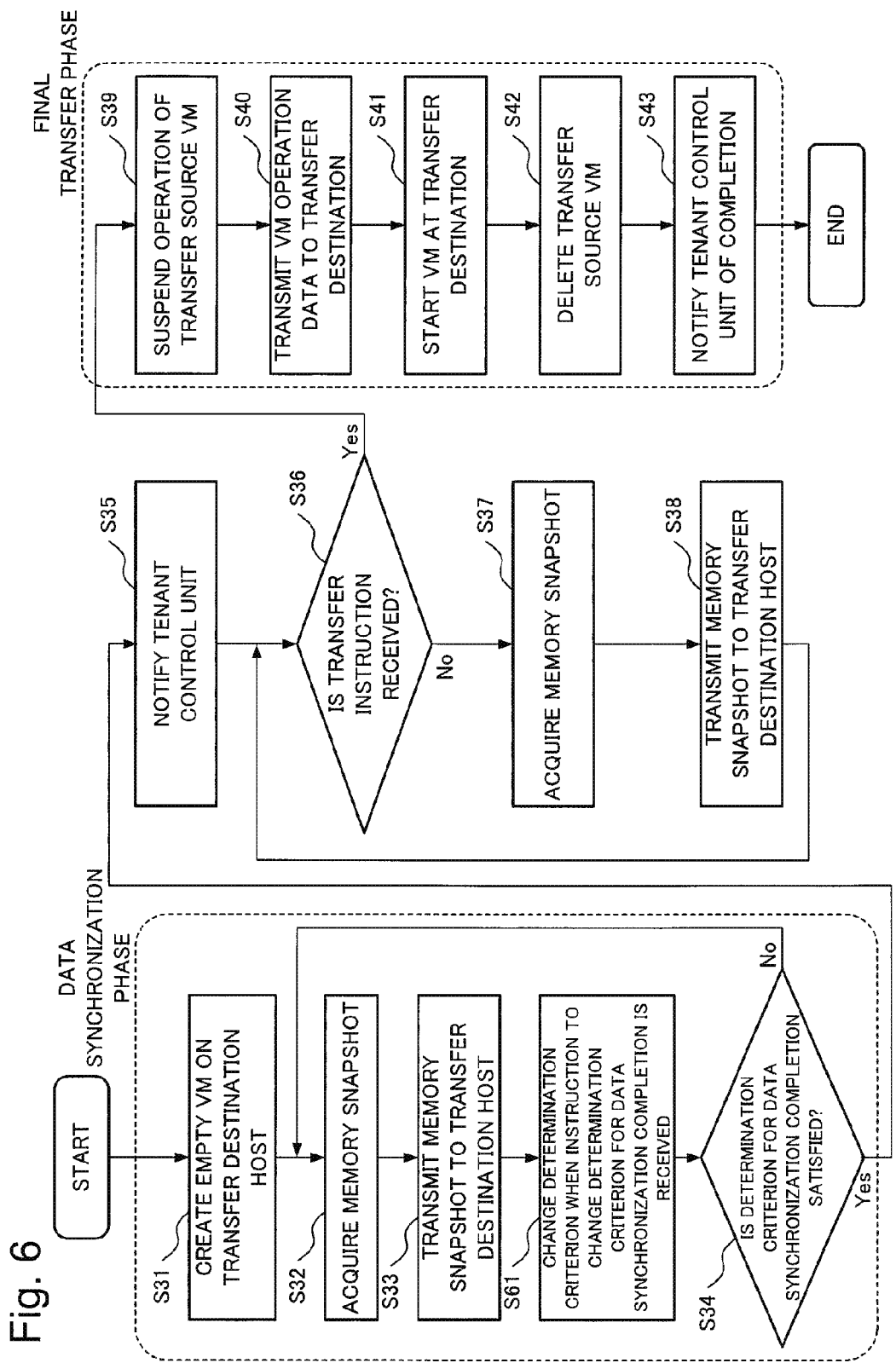
FIG. 6 is a flowchart illustrating operations of a transfer means and a synchronization status monitor means according to the second exemplary embodiment.
Figure 7:
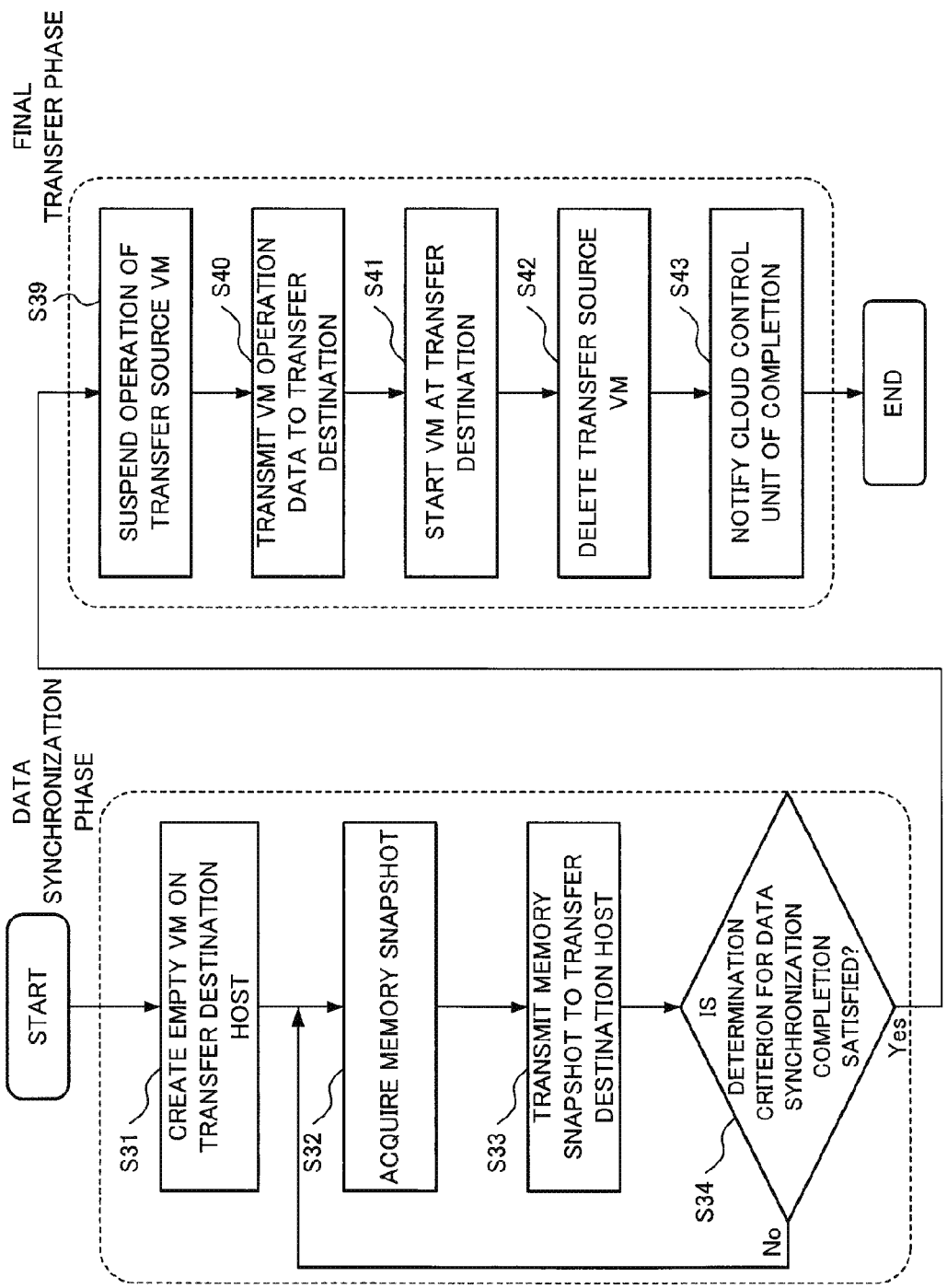
FIG. 7 is a flowchart illustrating a general live-migration method.

Next, the following describes operations of the virtual machine operation control means 31 according to the second exemplary embodiment. FIG. 6 is a flowchart illustrating operations of the transfer means 61A and the synchronization status monitor means 51A.

The operation flow in the second exemplary embodiment differs from the operation flow in the first exemplary embodiment in that step S61 is added to the operation flow in the second exemplary embodiment. In the second exemplary embodiment, as in the above description of the operation flow of the tenant control means 10, at step S52, the tenant control means 10 provides a notification of a change of the determination criterion for data synchronization completion for a virtual machine that was not determined to be completed data synchronization during the data synchronization phase.

At step S61, the synchronization status monitor means 51A receives a notification on a determination criterion from the tenant control means 10 and changes the criterion for data synchronization completion. At step S34, completion of data synchronization is determined based on the changed determination criterion.

According to the second exemplary embodiment, in addition to the advantageous effects of the first exemplary embodiment, the duration of the synchronization phase can be reduced during live-migration of a virtual machine. In other words, a situation can be prevented where the time to complete migrating all the virtual machines is long because the data synchronization phase of a certain virtual machine takes a long time.

For example, the following describes a case where the data synchronization phase of the virtual machine 82 takes a long time, as illustrated in FIG. 4, which is a diagram illustrating elapse of the time for the migration according to the first exemplary embodiment. In the second exemplary embodiment, an explanation is made on the assumption that the determination criterion for data synchronization completion for the virtual machine 82 is relaxed when the number of virtual machines that are not determined to be completed data synchronization is one.

In FIG. 4, the number of virtual machines to be migrated is two, and thus the criterion for synchronization completion is changed (the determination threshold of the amount of data difference between memory snapshots is increased) at the time T2. In the second exemplary embodiment, the above described change of the determination criterion for synchronization allows the virtual machine 82 to be regarded as having completed synchronization and the live-migration operation to proceed. This operation allows the final transfer phases to start earlier. As a result, the overall time to complete migrating all the virtual machines can be reduced.

The above described exemplary embodiments are not intended to limit specific configurations of the present invention. The present invention covers any modifications in design and the like that would fall within the scope and spirit of the invention. While two virtual machines to be migrated are described in the above exemplary embodiments, these embodiments are not intended to limit the number of virtual machines to be migrated. The present invention can be applied to migration of any number of virtual machines.

For example, although the above exemplary embodiments have been described as hardware configurations, the present invention is not limited to the exemplary embodiments. Any processing of the hardware can also be achieved by causing a central processing unit (CPU) to execute a computer program. The computer program can be stored in various types of non-transitory computer-readable media to be provided to a computer. Examples of the non-transitory computer-readable medium include various types of tangible storage media. Specifically, examples of the non-transitory computer-readable medium include a magnetic recording medium (e.g., a flexible disk, a magnetic tape, and a hard disk drive), a magneto-optical recording medium (e.g., a magneto-optical disc), a compact disc read only memory (CD-ROM), a CD recordable (CD-R), and a CD rewritable (CD-R/W), and a semiconductor memory (e.g., a mask ROM, a programmable ROM (PROM), an erasable PROM (EPROM), a flash ROM, and a random access memory (RAM)). The computer program may be provided to a computer by various types of transitory computer-readable media. Examples of the transitory computer-readable medium include electrical signals, optical signals, and electromagnetic waves. The transitory computer-readable medium can provide the computer program to a computer via a wired communication path, such as an electric wire and an optical fiber, or wireless communication path.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2012-155909, filed on Jul. 11, 2012, the disclosure of which is incorporated herein in its entirety by reference.

REFERENCE SIGNS LIST 1 migration system
10 tenant control means
31 physical host
32 physical host
41 virtual machine operation control means
42 virtual machine operation control means
51A synchronization status monitor means
52A synchronization status monitor means
61A transfer means
62A transfer means
61B transfer means
62B transfer means
81A virtual machine
82A virtual machine
81B virtual machine
82B virtual machine

What is claimed is:

1. A migration system comprising:
a transfer unit which transmits memory data of a plurality of virtual machines from a transfer source physical host to a transfer destination physical host to synchronize data of the virtual machines on the transfer source physical host with data of the virtual machines on the transfer destination physical host;
a determination unit which determines, for each of the virtual machines, whether the data of the virtual machine on the transfer source physical host is synchronized with the data of the virtual machine on the transfer destination physical host, based on a predetermined determination criterion for synchronization; and
a control unit which issues an instruction of switching from the virtual machines on the transfer source physical host to the virtual machines on the transfer destination physical host, based on a result determined by the determination unit, wherein
the control unit issues the instruction of the switching if, for all the virtual machines, the data of the virtual machine on the transfer source physical host is synchronized with the data of the virtual machine on the transfer destination physical host, and
the transfer unit continues transmitting the data from the transfer source physical host to the transfer destination physical host until the instruction of the switching is issued.

2. The migration system according to claim 1, wherein the control unit adjusts the determination criterion for synchronization for a virtual machine that has not completed synchronization when a predetermined number of virtual machines among the virtual machines have completed synchronization.

3. The migration system according to claim 2, wherein
the determination unit determines completion of synchronization when an amount of difference between the data of the virtual machine on the transfer source physical host and the data of the virtual machine of the transfer destination physical host is equal to or smaller than a predetermined threshold, and
when the control unit controls the determination criterion for synchronization to be adjusted, the threshold of data difference is increased.

4. A migration method for a virtual machine comprising:
transmitting memory data of a plurality of virtual machines from a transfer source physical host to a transfer destination physical host to synchronize data of the virtual machines on the transfer source physical host with data of the virtual machines on the transfer destination physical host;
determining, for each of the virtual machines, whether the data of the virtual machine on the transfer source physical host is synchronized with the data of the virtual machine on the transfer destination physical host, based on a predetermined determination criterion for synchronization;
issuing an instruction of switching from the virtual machines on the transfer source physical host to the virtual machines on the transfer destination physical host, if, for all the virtual machines, the data of the virtual machine on the transfer source physical host is synchronized with the data of the virtual machine on the transfer destination physical host, based on a result of the determining; and continuing transmitting the data from the transfer source physical host to the transfer destination physical host until the instruction of the switching is issued.

5. The migration method according to claim 4, further comprising adjusting the determination criterion for synchronization for a virtual machine that has not completed synchronization when a predetermined number of virtual machines among the virtual machines have completed synchronization, in the determining, for each of the virtual machines, whether the data of the virtual machine on the transfer source physical host is synchronized with the data of the virtual machine on the transfer destination physical host.

6. The migration method according to claim 5, wherein
completion of synchronization is determined when an amount of difference between the data of the virtual machine on the transfer source physical host and the data of the virtual machine of the transfer destination physical host is equal to or smaller than a predetermined threshold, in the determining, for each of the virtual machines, whether the data of the virtual machine on the transfer source physical host is synchronized with the data of the virtual machine on the transfer destination physical host, and
the threshold of data difference is increased, in the adjusting the determination criterion for synchronization.

7. A non-transitory computer readable storage medium recording thereon a control program, causing a computer to perform a migration process for a plurality of virtual machines by controlling a transfer source physical host and a transfer destination physical host, the process comprising:
transmitting memory data of the virtual machines from the transfer source physical host to the transfer destination physical host to synchronize data of the virtual machines on the transfer source physical host with data of the virtual machines on the transfer destination physical host;
determining, for each of the virtual machines, whether the data of the virtual machine on the transfer source physical host is synchronized with the data of the virtual machine on the transfer destination physical host, based on a predetermined determination criterion for synchronization;
issuing an instruction of switching from the virtual machines on the transfer source physical host to the virtual machines on the transfer destination physical host, if, for all the virtual machines, the data of the virtual machine on the transfer source physical host is synchronized with the data of the virtual machine on the transfer destination physical host, based on a result of the determining; and
continuing transmitting the data from the transfer source physical host to the transfer destination physical host until the instruction of the switching is issued.

8. The non-transitory computer readable storage medium recording thereon the control program according to claim 7, causing the computer to perform the migration process further comprising adjusting the determination criterion for synchronization for a virtual machine that has not completed synchronization when a predetermined number of virtual machines among the virtual machines have completed synchronization, in the determining, for each of the virtual machines, whether the data of the virtual machine on the transfer source physical host is synchronized with the data of the virtual machine on the transfer destination physical host.

9. The non-transitory computer readable storage medium recording thereon the control program according to claim 8, causing the computer to perform the migration process, wherein
completion of synchronization is determined when an amount of difference between the data of the virtual machine on the transfer source physical host and the data of the virtual machine of the transfer destination physical host is equal to or smaller than a predetermined threshold, in the determining, for each of the virtual machines, whether the data of the virtual machine on the transfer source physical host is synchronized with the data of the virtual machine on the transfer destination physical host, and
the threshold of data difference is increased, in the adjusting the determination criterion for synchronization.

10. A migration system comprising:
a transfer means for transmitting memory data of a plurality of virtual machines from a transfer source physical host to a transfer destination physical host to synchronize data of the virtual machines on the transfer source physical host with data of the virtual machines on the transfer destination physical host;
a determination means for determining, for each of the virtual machines, whether the data of the virtual machine on the transfer source physical host is synchronized with the data of the virtual machine on the transfer destination physical host, based on a predetermined determination criterion for synchronization; and
a control means for issuing an instruction of switching from the virtual machines on the transfer source physical host to the virtual machines on the transfer destination physical host, based on a result determined by the determination means, wherein
the control means issues the instruction of the switching if, for all the virtual machines, the data of the virtual machine on the transfer source physical host is synchronized with the data of the virtual machine on the transfer destination physical host, and
the transfer means continues transmitting the data from the transfer source physical host to the transfer destination physical host until the instruction of the switching is issued.

\* \* \* \* \*